United States Patent [19]

Alexander

[11] Patent Number: 4,709,767
[45] Date of Patent: Dec. 1, 1987

[54] PRODUCTION PROCESS FOR MANUFACTURING LOW MOLECULAR WEIGHT WATER SOLUBLE ACRYLIC POLYMERS AS DRILLING FLUID ADDITIVES

[75] Inventor: William Alexander, Naperville, Ill.

[73] Assignee: American Colloid Company, Arlington Heights, Ill.

[21] Appl. No.: 816,290

[22] Filed: Jan. 6, 1986

[51] Int. Cl.$^4$ .............................................. E21B 21/00
[52] U.S. Cl. ....................................... 175/65; 166/268; 166/269; 166/273; 166/274; 166/275; 252/8.513; 524/827; 524/831; 524/832; 524/916
[58] Field of Search ............... 524/827, 831, 832, 916; 252/8.513; 166/268, 269, 273, 274, 275; 175/65

[56] References Cited

U.S. PATENT DOCUMENTS

| | | | |
|---|---|---|---|
| 3,687,846 | 8/1972 | Lang | 252/8.513 |
| 3,915,921 | 10/1975 | Schlatzer, Jr. | 524/916 |
| 4,113,688 | 9/1978 | Pearson | 524/916 |
| 4,172,066 | 10/1979 | Zweigle et al. | 252/8.513 |
| 4,236,545 | 12/1980 | Knight et al. | 252/8.513 |
| 4,476,029 | 10/1984 | Sif et al. | 252/8.512 |
| 4,525,527 | 6/1985 | Takeda et al. | 524/827 |
| 4,552,938 | 11/1985 | Mikita et al. | 524/832 |
| 4,603,154 | 7/1986 | Luetzelschwab | 524/827 |

*Primary Examiner*—Joseph L. Schofer
*Assistant Examiner*—Bernard Lipman
*Attorney, Agent, or Firm*—Mason, Kolehmainen, Rathburn & Wyss

[57] ABSTRACT

Disclosed is a process for preparing relatively low molecular weight, water absorbing, acrylic polymers for use as drilling fluid additives by aqueous polymerization of (A) an acrylic monomer, such as acrylic acid neutralized 0 to 100 mole percent with, for example, ammonia, and/or an alkali such as $Na_2O_3$, and/or an amine; with (B) acrylamide in a mole ratio of 70 to 100 mole percent (A) to 30:0 mole percent (B). The molecular weight is limited to 1,000 to 50,000, such as by adding a chain transfer agent to the polymerization mixture, to achieve excellent results as a drilling fluid additive. The monomer, such as partially neutralized acrylic acid, is polymerized in aqueous solution in the presence of a polymerization initiator without external heating while allowing water to evaporate off. A substantially dry water soluble polymer (less than 15 weight percent water) is achieved when polymerization is completed by utilizing the exothermic heat of polymerization and cross-linking to drive off water without the need for additional heating to obtain a dry solid.

11 Claims, 1 Drawing Figure

PRODUCTION PROCESS FOR MANUFACTURING LOW MOLECULAR WEIGHT WATER SOLUBLE ACRYLIC POLYMERS AS DRILLING FLUID ADDITIVES

CROSS REFERENCE TO RELATED APPLICATIONS

This application is a continuation-in-part of application Ser. No. 748,528, filed June 25, 1985.

FIELD OF THE INVENTION

The present invention relates to a method of manufacturing water-soluble, low molecular weight acrylic resins having new and unexpected capabilities of lowering the viscosity of aqueous suspensions, such as drilling fluids.

BACKGROUND OF THE INVENTION

Low molecular weight polyacrylate resins have been used as defloculants or dispersants in water-based drilling fluids or dispersants as disclosed in U.S. Pat. Nos. 2,552,775 and 4,521,578; and 3,764,530.

One of the processes for polymerizing acrylic acid and acrylates is aqueous solution polymerization. The polymer obtained by this process is soluble in water, is obtained in an aqueous solution and may be dried to a dry product before use in aqueous solution. Thus, the aqueous solution must be dehydrated (dried) to obtain a water-soluble resin in the desired solid or powder form. It is nevertheless difficult to dry the reaction product efficiently by the usual rotary drum roller method or spray drying method because care must be taken to avoid cross-linking and an insoluble product which results from overheating during drying.

SUMMARY OF THE INVENTION

In brief, the present invention is directed to a process for preparing water-soluble, acrylate resins by aqueous polymerization of (A) acrylic acid neutralized 0 to 100 mole percent with, for example, ammonia, and/or alkali and/or an amine; with (B) acrylamide in a mole ratio of 70 to 100 mole percent (A) to 30:0 mole percent (B) to obtain a low molecular weight, water-soluble resin.

In accordance with the present invention, a heated aqueous solution comprising (A) an acrylic type monomer, such as acrylic acid neutralized 0 to 100 mole percent with, for example, ammonia, and/or alkali and/or an amine is subjected to polymerization in the presence of a polymerization initiator without external heating while allowing water to evaporate off to form a water-soluble polyacrylate resin for use as a viscosity reducing agent in aqueous suspensions.

Accordingly, an object of the present invention is to provide a process for preparing a water-soluble polyacrylate resin of low molecular weight for use as a viscosity reducing agent in a drilling fluid by aqueous solution polymerization to obtain a dry polymer (15% or less water) without any additional dehydrating or drying step.

Another object of the present invention is to provide a process for preparing a polyacrylate resin by polymerization of acrylic acid neutralized 0 to 100 mole percent, having a molecular weight of about 1,000 to about 50,000 to obtain a dry resin without external heating during polymerization.

Another object of the present invention is to provide a process for preparing a polyacrylate resin by copolymerization of acrylic acid neutralized 0 to 100 mole percent, with acrylamide in proportions of 0 to 30 mole percent acrylamide and 70-100 mole percent acrylic or acrylic derived monomer.

The above and other objects and advantages of the present invention will become apparent from the following detailed description of the preferred embodiment.

BRIEF DESCRIPTION OF THE DRAWING

The FIG. 1 is a graph showing the reduction in apparent viscosity (AV) in centipoises, plastic viscosity (PV) in centipoises, and yield point (YP) in pounds/100 ft$^2$ upon the addition of the low molecular weight polymer of the present invention to a typical drilling fluid having 22.5 pounds of bentonite per 55 gal. barrel.

DETAILED DESCRIPTION OF THE PREFERRED EMBODIMENT

Figure 1:
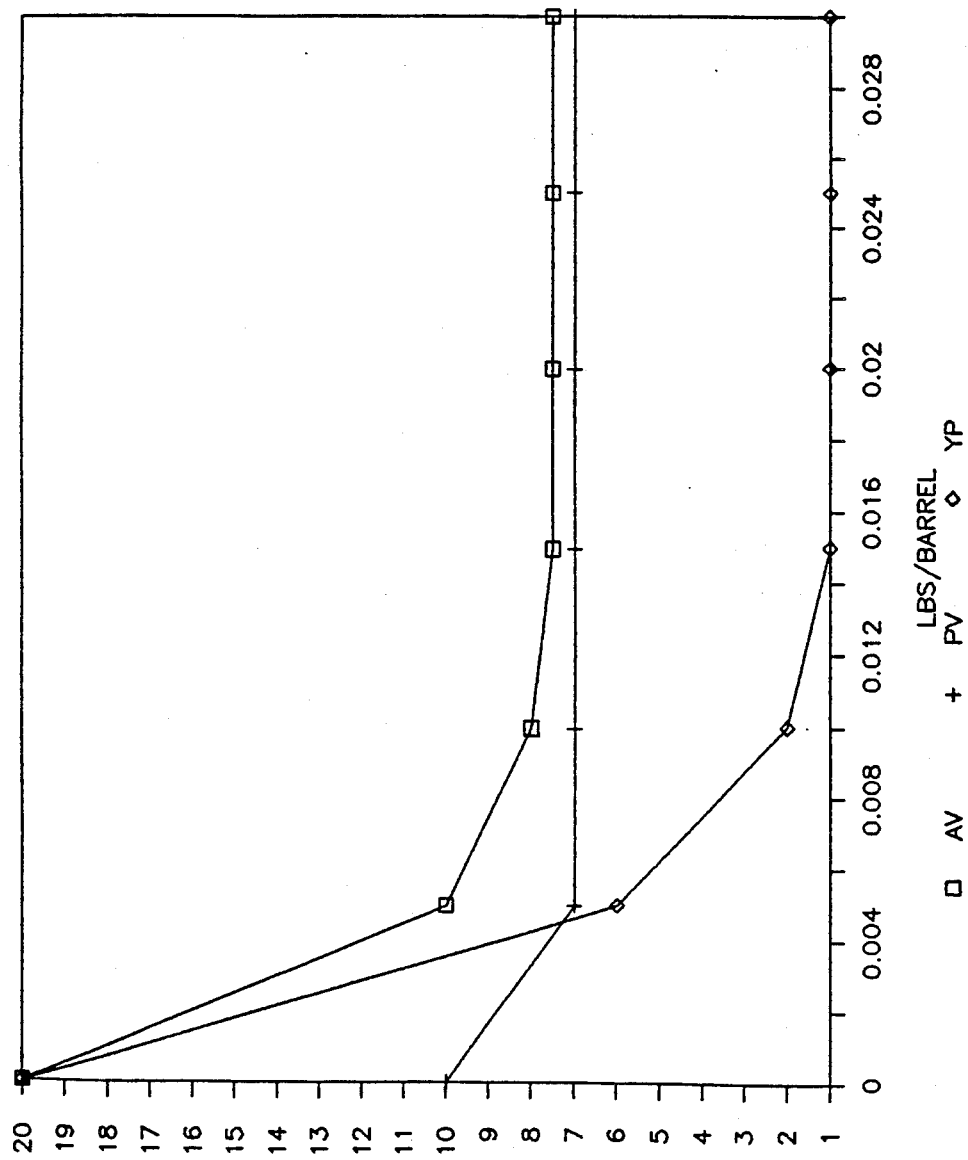

In accordance with the present invention an acrylic-type resin is prepared by aqueous solution polymerization while dehydrating or drying the reaction product during polymerization by utilizing the exothermic heat from the polymerization reaction for drying.

The acrylic type monomers capable of polymerization in accordance with the present invention to provide low molecular weight, water-soluble resins useful for lowering the viscosity of aqueous suspensions include the linear organic polymers having no, to very little, crosslinking between the individual polymer chains. Preferred monomers include acrylic acid; acrylamide; acrylic acid salts of alkali metals and ammonium; N-substituted acrylamide; and the corresponding derivatives of methacrylic acid. Other suitable monomers include methacrylic acid; the alkali metal and ammonium salts of methacrylic acid; methacrylamide; the various N-substituted methacrylamides, for example, the N-alkyl substituted amides, the N-aminoalkyl amides, and the N-alkylaminoalkyl substituted amides; and the aminoalkyl acrylates; the aminoalkyl methacrylamides, and the N-alkyl substituted aminoalkyl esters of either acrylic or methacrylic acid. Also suitable are any copolymers of these acrylic monomers, such as the copolymers formed with polycarboxylic acid derivatives, such as maleic anhydride; maleic acid; fumaric acid; itaconic acid; citraconic acid; aconitric acid; and the amides of these acids; as well as the alkaline earth metal and ammonium salts of these acids; the partial alkyl esters; salts of the partial alkyl esters and the substituted amides of these polycarboxylic acids. The term acrylic-type monomer, therefore, denotes a monomer having an acrylic moiety $CH_2=CH-COOH$ wherein one of more hydrogen atoms may be substituted with any radical or copolymerized or terpolymerized with any other monomer(s) so long as the resulting polymer, having a molecular weight of 1,000 to 50,000, is water-soluble.

It has been found that these acrylic-type monomers, such as acrylic acid, neutralized in the range of 0 to 100 mole percent will polymerize rapidly to drive away excess water leaving a solid water-soluble resin having a desired degree of polymerization as well as new and unexpected viscosity controlling ability in an aqueous drilling fluid. One or more polymerization catalysts or initiators can be added to the aqueous monomer mixture to aid in polymerization.

According to the present invention, a hot aqueous solution is prepared first which comprises acrylic acid neutralized 0 to 100 mole percent, and optionally acrylamide, in a mole ratio of acrylic acid to acrylamide of 70–100 mole percent acrylic acid to 30 to 0 mole percent acrylamide. The aqueous solution can be prepared easily usually by placing acrylic acid, an alkali such as potassium hydroxide and/or ammonium hydroxide and/or $Na_2CO_3$ or a basic amine, for neutralizing the acid in water. To dissolve the monomers thoroughly, the mixture can be heated to an elevated temperature. Any strongly basic alkali metal compound can be used for neutralization of the acrylic acid, such as potassium hydroxide, sodium hydroxide, lithium hydroxide, cesium hydroxide, potassium carbonate or sodium carbonate. The aqueous solution may contain up to about 100% of free acrylic containing monomers, such as acrylic acid. Use of an excessive amount of the neutralizing agent will not raise any particular problem, but is generally avoided since the excess does not participate in the polymerization reaction.

We have also found that when the aqueous solution further contains an organic solvent having a boiling point of 40° to 150° C., the temperature of the aqueous solution is controllable with great ease.

When incorporating an organic solvent according to one embodiment of the invention, the aqueous monomer solution has a solidifying point which is about 10° to about 20° C. lower than otherwise. This increases the allowable range of temperature control at least about 3 times. The organic solvent used is vigorously evaporated along with water by the heat of polymerization of the monomer. Since the latent heat of the evaporation is considerably smaller than that of water, the organic solvent functions as a blowing agent in the polymerization reaction system, consequently rendering the resulting dry resin porous.

Examples of organic solvents to be used in the invention when desired and having a boiling point of 40° to 150° C. are methanol, ethanol, propanol and like alcohol solvents, acetone, methyl ethyl ketone and like detone solvents, cyclohexane, n-hexane, n-heptane and like hydrocarbon solvents, benzene, toluene and like aromatic hydrocarbon solvents, and tetrahydrofuran and like furan solvents. These solvents may be used singly or in admixture. The solvent is used in an amount of 0.5 to 15 wt. %, preferably 1 to 10 wt. %, based on the combined amount of the monomers (A) plus (B). The boiling point of the solvent is more preferably in the range of 55° to 120° C.

In accordance with the present invention, acrylic acid neutralized 0 to 100 mole percent is mixed with water at a temperature of about 20° to 100° C. The solution is subjected to a polymerization reaction by the addition of a polymerization initiator. The molecular weight must be controlled for the resulting polymer to be useful as a viscosity controlling agent in a drilling mud. For example, high molecular weight polyacrylic acid is used as a thickener for water-base muds; however, low molecular weight polyacrylic acid is used as a deflocculant. The control of molecular weight can be achieved through the regulation of reaction temperatures, starting materials, i.e., monomer and initiator concentrations, or through the use of "scavengers", such as mercaptans, or through the introduction of functional monomers which exhibit high chain transfer capability.

The polymerization reaction proceeds sufficiently within a very short period of time and the heat of the polymerization reaction will evaporate water rapidly from the reaction system to form a dry solid (less than 15 percent by weight water) low molecular weight resin without the need for any subsequent drying step. The solid can be easily pulverized into a powder suitable for addition to a suitable aqueous drilling fluid to lower its viscosity.

According to the preferred process of the invention, an aqueous solution is prepared first including an acrylic monomer neutralized 0 to 100 mole percent, optionally acrylamide, a chain transfer agent and water. The aqueous solution can be prepared easily by placing (A) acrylic acid, and an amine, and/or a caustic alkali and/or ammonia for neutralizing the acid; (B) acrylamide (0–30 mole percent); and (C) the chain transfer agent, into water to form a mixed monomer solution. To dissolve the monomer(s) thoroughly, the mixture can be heated to an elevated temperature up to the boiling point of water, i.e. 100° C.

The aqueous mixed monomer solution is heated and thereafter subjected to polymerization reaction with the addition of a polymerization initiator. Although the temperature of the aqueous mixed monomer solution is not particularly limited since the mixed monomer solution is initiated into polymerization by the addition of the initiator, the temperature is usually about 25° C. to about 85° C., preferably about 25° to about 75° C. Various polymerization initiators are usable which are known for use in preparing polyacrylates. Examples of useful initiators are redox initiators comprising a reducing agent, such as a sulfite or bisulfite of an alkali metal, ammonium sulfite or ammonium bisulfite, and an initiator, such as an alkali metal or ammonium persulfate or alkali metal or ammonium thiosulfate, in combination with the reducing agent. The mixture need not be heated when using these redox initiators to initiate the reaction. Other suitable initiators include azo initiators including azobis-isobutyronitrile, 4-t-butylazo-4'-cyanovaleric acid, 4,4'-azobis(4-cyanovaleric acid) and 2,2'-azobis(2-amidinopropane)-hydrochloric acid salt; trimethylolpropane triacrylate, and the like. These initiators can be used singly or in a suitable combination. Of these, especially preferable are a redox initiator composed of ammonium persulfate and sodium thiosulfate, and azo initiators such as azobisisobutyronitrile and 2,2'-azobis(2-amidinopropane)-hydrochloric acid. These initiators are advantageously used usually in the form of an aqueous solution but can be used as diluted with a suitable solvent. The initiator is used in a usual amount, i.e. in an amount, calculated as solids, of about 0.1 to about 10%, preferably about 0.5 to about 5%, of the combined weight of the monomers, namely acrylamide if present. The initiator is usable together with isopropyl alcohol, alkylmercaptan or other chain transfer agents to control the molecular weight of the polyacrylate to a weight average molecular weight of about 1,000 to about 50,000.

By the addition of the polymerization initiator, the mixed monomer solution is subjected to polymerization with evaporation of water without heating the system from outside. More advantageously, the reaction is carried out by admixing a predetermined amount of the initiator and chain transfer agent, or an aqueous solution thereof, with the mixed monomer solution and causing the resulting mixture to flow down onto and spread over a traveling conveyor belt. The initiator can be added to the mixed monomer solution as it is poured onto the conveyor belt.

Briefly, the aqueous solution, including the polymerization initiators, includes an acrylic-containing monomer in an amount of 50–90% of the solution; a neutralizing compound for the monomer in an amount of 0 to 100 mole percent of the monomer; a chain transfer agent in an amount of 1–10% by weight of the monomer (or other means to limit the molecular weight of the resulting polymer to a weight average molecular weight of about 1,000 to about 50,000); a polymerization initiator in an effective amount, generally about 1 to 2% by weight of the solution; and water in an amount of about 1% to about 40% by weight of the solution. The heat of polymerization is capable of completely evaporating all water from a solution containing about 20% by weight water, so that any amount of water in solution greater than about 20% by weight of the solution will remain absorbed in the resulting solid, water-soluble polymer. So long as the water in solution is 40% or less, a solid, water-soluble product will result, although some of the polymer may be in solution, absorbed in the remaining, solid product.

The monovalent salt of 2-acrylamido-2-methylpropane sulfonic acid (referred to herein as AMPS a registered trademark of Lubrizol, Inc.) also may be included in the drilling fluid additives of the present invention to provide the polymer with tolerance for salt contamination from the surrounding formations. The structure is illustrated in the following formula, where M+ represents a cation. The AMPS containing polymers exhibit satisfactory ion stability attributable to the exceptionally large ionization constant and hydrogen bonding capability of AMPS units. Functionally, the AMPS units also provide fluid loss control capability. Monovalent salts of vinylsulfonic acid and 2-sulfoethyl methacrylate also can be used in the present invention. The concentration of the monovalent salt of AMPS presented in the invention may vary from 5% to 50% by weight of the materials.

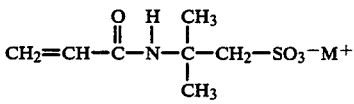

The polymerization proceeds rapidly after admixing the initiator with the mixed monomer solution and is completed within a short period of time, usually in about 30 seconds to about 10 minutes. The reaction is exothermic, so that the reaction system is rapidly heated to about 100° to about 130° C. by the heat of polymerization. Consequently, particularly where the acrylate monomer concentration in the mixed monomer solution is at least 50 percent by weight and preferably at least 70% by weight, the water evaporates from the system rapidly to give a relatively dry, solid, water-soluble polymer of low water content without resorting to any external heating. The water content of the polymer is usually up to about 15%, and generally about 8 to 12% by weight as recovered. Subsequently, the dry solid polymer can be made into a desired powder easily by a usual method, for example by pulverization, without a drying step.

The present invention will be described in greater detail with reference to the following examples. The percentages of components in all examples are by weight, unless otherwise specified.

EXAMPLE 1

To deionized water are added, wherein percents are weight percents based on the total weight of the monomer solution formed, 73.7% acrylic acid first, then 16.9% sodium carbonate serving as the neutralizing agent. Thereafter 7.45% of 2-mercapto ethanol chain transfer agent is added to prepare an aqueous solution of potassium sodium acrylate and acrylic acid (22% neutralization of acrylic acid).

With the aqueous solution at room temperature (25° C.) are admixed 0.4% sodium thiosulfate and 0.3% ammonium persulfate polymerization initiators. The final solution is as follows:

| CHEMICALS | WT. % |
|---|---|
| ACRYLIC ACID | 73.7% |
| SODIUM CARBONATE | 16.9% |
| 2-MERCAPTO ETHANOL | 7.5% |
| POLYMERIZATION INITIATORS | 0.4% |
| SODIUM THIOSULFATE | 0.3% |
| AMMONIUM PERSULFATE | 1.2% |
| TOTAL | 100.00 |

The mixture is poured onto a traveling endless belt and spread thereover in the form of a layer about 10 mm in thickness. About 30 seconds thereafter, the mixture starts to polymerize, and the reaction is completed in about 1 minute. The maximum temperature of the mixture during the reaction is about 120° C.

The polymer is allowed to complete curing for about 30 minutes at ambient temperature to give a dry solid strip of sodium polyacrylate and polyacrylic acid product having a water content of 11% and a molecular weight of 1000. The strip is made into a powder by a pulverizer.

EXAMPLES 2 to 4

Polymers are prepared in the same manner as in Example 1 with the exception of varying the concentration of monomer, the kind and amount (degree of neutralization) of neutralizing agent, and the amounts of polymerization initiator. The following compositions were polymerized:

EXAMPLE 2

| EXAMPLE 2 | |
|---|---|
| ACRYLIC ACID | 56.80% |
| AMMONIUM CARBONATE | 11.36% |
| POLYMERIZATION INITIATOR | 0.44% |
| 2-MERCAPTO ETHANOL | 5.0% |
| 2-ACRYLAMIDO-2-METHYLPROPANE SULFONIC ACID | 7.0% |
| H$_2$O | 19.4% |
| TOTAL | 100.00% |

EXAMPLE 3

| EXAMPLE 3 | |
|---|---|
| METHACRYLIC ACID | 57.13% |
| AMMONIUM CARBONATE | 11.43% |
| AZO POLYMERIZATION INITIATOR | 0.57% |
| 2-MERCAPTO ETHANOL | 9.0% |
| 2-ACRYLAMIDO-2-METHYLPROPANE | 9.0% |

-continued

EXAMPLE 3

| SULFONIC ACID | |
|---|---|
| H$_2$O | 12.87% |
| TOTAL | 100.00% |

EXAMPLE 4

| EXAMPLE 4 | |
|---|---|
| ACRYLONITRILE | 54.66% |
| POTASSIUM HYDROXIDE | 10.93% |
| AMMONIUM HYDROXIDE | 30.61% |
| 2-MERCAPTO ETHANOL | 10.0% |
| POLYMERIZATION INITIATOR | 0.41% |
| H$_2$O | 3.39% |
| TOTAL | 100.00% |

EXAMPLE 5

To 22.2 g of deionized water are added 72.1 grams of acrylic acid first, then 49.5 g of potassium hydroxide having a concentration of 85% by weight and serving as a neutralizing agent, and thereafter 0.1 gram of 2-mercapto ethanol as a chain transfer agent to prepare an aqueous solution of potassium acrylate having a neutralization degree of 75%.

With the aqueous solution at room temperature (25° C.) is admixed 2.9 grams of 18% by weight aqueous solution of ammonium persulfate (about 0.5 wt. % based on the combined weight of the potassium acrylate and free acrylic acid, the same as hereinafter). The mixture is poured onto a traveling endless belt and spread thereover in the form of a layer about 10 mm in thickness. About 30 seconds thereafter, the mixture starts to polymerize, and the reaction is completed in about 1 minute. The maximum temperature of the mixture during the reaction is about 120° C.

The reaction gives a dry solid strip of water-soluble potassium polyacrylate product having a water content of 11% and a residual monomer concentration of 1200 ppm. The strip is made into a powder by a pulverizer.

EXAMPLES 6 to 9

Methacrylic acid (72.1 grams), 18.0 grams of deionized water, 40.9 grams of solid potassium hydroxide (water content 4%) and 5.2 grams of a solvent (Ex. 6—Acetone; Ex. 7—Ethanol; Ex. 813 Bentone; and 8% by weight 2,2'-azobis(2-amidinopropane)-hydrochloric acid salt; and Ex. 9—Tetrahydrofuran) are mixed together, and the mixture is maintained at 75° C. With the mixture is further admixed 4.0 grams of 2-mercapto ethanol. The resulting mixture is immediately poured onto a traveling endless belt and spread thereover to a thickness of 5 mm. About 15 seconds later, the mixture starts to polymerize, and the polymerization is completed in about 30 seconds. The maximum temperature of the mixture during the reaction is 130° to 135° C.

The reaction gives a dry strip of potassium polyacrylate product, which is pulverized to a powder 20 to 100 mesh in particle size.

The same procedure as above is repeated with use of the other solvents. All the powders obtained are water-soluble and have a water content of 4 to 6%.

EXAMPLE 10

An aqueous monomer solution is prepared in the same manner as in examples 6 to 9 with the exception of not using any organic solvent and using 23.2 grams of deionized water. The solution is thereafter subjected to polymerization in the same manner as in the previous examples to obtain a powder of a water-soluble acrylate dry solid.

EXAMPLE 11

281.0 grams of acrylic acid and 11.9 grams of acrylamide were dissolved in 179.1 grams of distilled water and then 10.9 grams of NaOH was added for 70 mole percent partial neutralization of acrylic acid; 0.5 gram of 2-mercapto ethanol was then added as the chain transfer agent. In this example, 0.04 gram of 2,2'-azobis(2-amidinopropane)hydrochloride was added as the polymerization initiator and the initial temperature of the mixed monomer solution was 50° C.

EXAMPLE 12

48.1 grams of acrylic acid and 11.9 grams of acrylamide were dissolved in 159 grams of distilled water and then 22.7 grams of NaOH was added for partial neutralization of acrylic acid in an amount of 85 mole percent. 1.0 grams of 2-mercapto ethanol was then added as the polyvinyl monomer. In addition, 0.048 gram of ammonium persulfate and 0.048 gram of sodium hydrogen-sulfite were added as the polymerization initiators. In this example, the initial temperature of the mixed monomer solution was 40° C.

EXAMPLE 13

90.1 grams of methacrylic acid and 9.9 grams of acrylamide were dissolved in 118.8 grams of distilled water and 52.6 grams of KOH was added for 75 mole percent partial neutralization of acrylic acid. 2.0 grams of 2-mercapto ethanol was added as the chain transfer agent, and 0.08 grams of ammonium persulfate and 0.08 gram of sodium hydrogen-sulfite were added as the polymerization initiators. The initial temperature of the mixed monomer solution was 30° C.

EXAMPLE 14

48.1 grams of partially hydrolyzed acrylonitrile and 11.9 grams of acrylamide were dissolved in 252.1 grams of distilled water. In addition, 5.0 grams of 2-mercapto ethanol was added as the chain transfer agent. The polymerization was performed with the addition of 0.048 gram of ammonium persulfate and 0.048 gram of sodium hydrogen-sulfite for initiation. In this example, the initial temperature of the mixed monomer solution was 30° C.

EXAMPLE 15

52.7 grams of acrylic acid and 17.3 grams of acrylamide were dissolved in 25 grams of distilled water and they were partially neutralized 80 mole percent with the addition of 32.8 grams of KOH. 8.0 grams of 2-mercapto ethanol was added as to the polyvinyl monomer. For the polymerization catalyst 0.7 gram of 2,2'-azobisisobutyronitrile dissolved in 10 cc. of acetone was added. This solution was kept at 80° C. in a TEFLON coated, glass fiber reaction chamber until completion of polymerization yielding a white, solid, water-soluble resin.

EXAMPLE 16

17.3 grams of acrylamide was dissolved in 52.7 grams of acrylic acid and partial (70 mole percent) neutralization of acrylic acid was accomplished by the addition of 30 grams of aqueous ammonia having a concentration of 29 weight percent. In this example, for the chain transfer agent 5 grams of 2 mercaptoethanol was added and, as the initiator, 0.7 gram of 2,2'-azobis(2-amidinopropane)hydrochloride dissolved in 8 grams of distilled water was added. The polymerization was started at 80° C. yielding a white, solid, water-soluble resin.

EXAMPLE 17

21 kilograms of acrylic acid and 7 kilograms of acrylamide were dissolved in 9.5 kg. of distilled water and the acrylic acid was partially neutralized with 12 kilograms of KOH. 7.0 grams of thioglycolic acid as a chain transfer agent was added to provide an aqueous mixed monomer solution. The mixed monomer solution was mixed with 0.28 kilograms of 2,2'-azobisisobutyronitrile, dissolved in 2 kilograms of acetone as a polymerization initiator. This mixture at a temperature of 60° C. was transferred on an endless belt (600–700 mm. in width, and 7 m. in length) at a thickness of about 1 cm. The polymerization was initiated promptly on the belt resulting in a white, solid, water-soluble resin.

EXAMPLE 18

52.7 grams of acrylic acid and 17.3 grams of acrylamide were dissolved in 20 grams of distilled water. 32.8 grams of KOH was added for 80 mole percent partial neutralization of acrylic acid. Then 4.0 grams of 2-mercapto ethanol chain transfer agent was added. The aqueous monomer mixture was homogenized with agitation. Next, as an initiator, 0.7 gram of 2,2'-azobisisobutyronitrile dissolved in 10 cc of acetone was added. This mixed solution was kept at 80° C. in a water bath surrounding the reaction chamber. Polymerization was initiated as the temperature of the mixture increased as a result of the surrounding water bath, resulting in a white, solid, water-soluble resin.

EXAMPLE 19

20.8 grams of acrylamide was dissolved in 49.2 grams of acrylic acid and 28.0 grams of aqueous ammonia (29% concentration) was added for 70 mole percent neutralization of the acrylic acid. Next, 5.0 grams of 2-mercapto ethanol was added and stirred to homogenize. As an initiator, 0.7 gram of 2,2'-azobis(2-amidinopropane)-hydrochloride dissolved in 5 grams of distilled water, was added. The polymerization was initiated in a TEFLON coated glass reaction chamber kept at 80° C., yielding a white, solid, water-soluble low molecular weight polymer having a water content of about 10% by weight.

EXAMPLE 20

70 grams of acrylic acid was dissolved in 20 grams of distilled water. 40.8 grams of KOH was added to neutralize 75 mole percent of the acrylic acid. Next, 6.0 grams of 2-mercapto ethanol was added, and the mixture homogenized with agitation. Then, as an initiator, 0.7 gram of 2,2'-azobisisobutyronitrile dissolved in 10 cc. of acetone was added. This solution was transferred to the reaction chamber kept at 80° C. and polymerization was initiated with a rise in temperature of the mixture resulting in a white, solid, water-soluble low molecular weight polymer of low water content.

EXAMPLE 21

52.7 grams of acrylic acid and 17.3 grams of acrylamide were dissolved in 20 grams of distilled water. 32.8 grams of potassium hydroxide was added to neutralize 80 mole percent of the acrylic acid. Next, 1.5 grams of 2-mercapto ethanol was added and homogenized under stirring. Then, as the initiator, 0.7 gram of 2,2'-azobisisobutyronitrile dissolved in 10 cc. of acetone solution was added. The mixed monomer solution was kept at 80° C. in the reaction chamber immersed in a water bath. With the increasing temperature of the mixed monomer solution polymerization was initiated resulting in a white, solid, water-soluble, low molecular weight polymer.

EXAMPLE 22

20.8 grams of acrylamide was dissolved in 49.2 grams of acrylic acid. 28.0 grams of aqueous ammonia (29% concentration) was added to neutralize 70 mole percent of the acrylic acid. Then 2.0 grams of 2-mercapto ethanol was added and the solution was homogenized with agitation. Next, as the initiator, 0.7 gram of 2,2'-azobis(2-amidinopropane)-hydrochloride dissolved in 5 grams of distilled water was added. The solution was kept at 80° C. and polymerization was initiated with increased temperature resulting in a white, solid, water-soluble, low molecular weight polymer.

EXAMPLE 23

70 grams of acrylic acid was dissolved in 20 grams of distilled water and 40.8 grams of KOH was added to neutralize 75 mole % of the acrylic acid. Next, 3.0 grams of 2-mercapto ethanol was added and the mixture homogenized. Next, as the initiator, 0.7 gram of 2,2'-azobisisobutyronitrile dissolved in 10 cc of acetone was added. The mixed solution was kept at 80° C. in the water bath to initiate the polymerization resulting in a white, solid, water-soluble, low molecular weight polymer.

It should be understood that the present disclosure has been made only by way of preferred embodiment and that numerous changes in details of construction, combination and arrangement of parts may be resorted to without departing from the spirit and scope of the invention as hereinunder claimed.

What is claimed and sought to be secured by Letters Patent of the United States is:

1. A method of drilling comprising mixing a monomer solution of an acrylic monomer neutralized 0 to 100 mole percent; and water to form a mixed monomer solution, wherein the monomers of the mixed monomer solution consist essentially of one or more acrylic monomers; and the monomer concentration is 50–90 percent by weight of the monomer solution prior to polymerization initiation, and the water concentration is 1% to 40% of the monomer solution prior to polymerization initiation; and initiating polymerization of the acrylic monomer while limiting the weight average molecular weight of the acrylic polymer to 1,000 to 50,000 such that during polymerization, the exothermic heat of reaction is substantially the only heat energy used to accomplish polymerization, and to drive off sufficient water to form a solid, essentially uncrosslinked, water-soluble acrylic polymer having a water content of 15 percent by weight or less, and thereafter adding said water-soluble polymer in an effective amount up to about 0.03 pounds per barrel to a drilling fluid surrounding a drill bit to lower the viscosity of the drilling fluid during drilling of a bore hole.

2. The method of claim 1 further including the step of reducing the particle size of the solid, water-soluble acrylic polymer to a size such that substantially all of the polymer passes through a 4 mesh screen and at least 80% of the polymer passes through a 200 mesh screen prior to adding said polymer to the drilling fluid.

3. The method of claim 1 wherein the mixed monomer solution has a temperature of ambient to 85° C. prior to polymerization.

4. The method of claim 1 wherein the molecular weight of the acrylic polymer is limited by including a chain transfer agent in the mixed monomer solution.

5. The method of claim 4 wherein the chain transfer agent is a mercaptan.

6. The method of claim 1 further including the step of adjusting the temperature of the monomer solution to a temperature of 25° to 85° C. prior to adding said polymerization initiator to said monomer mixture.

7. The method of claim 1 wherein said polymerization initiator is added in an amount of at least 0.5% by total weight of said acrylic monomers.

8. The method of claim 1 wherein the water content of said water-soluble acrylic polymer is not greater than about 10% by weight as recovered from the polymerized mixture, without an additional drying step.

9. The method of claim 1 including the step of pulverizing said resin to form a powder prior to adding the polymer to the drilling fluid.

10. The method of claim 1 wherein water comprises at least 5.0 weight percent of the total weight of the acrylic monomers plus water in the mixed monomer solution.

11. The method of claim 1 wherein the acrylic monomer is selected from the group consisting of the free acid, the alkali metal salts, the ammonium salt, the amide, the ester, and the N-substituted amides of acrylic acid and methacrylic acid; acrylonitrile; the hydrolysis products of acrylonitrile; maleic anhydride; the free acid, the alkali metal salts, the ammonium salt, the amide, the ester, the partial amide, the partial ester, and the N-substituted amides of maleic anhydride, fumaric acid, itaconic acid, citraconic acid and aconitric acid; and mixtures thereof.

* * * * *